United States Patent

[11] 3,564,287

[72] Inventor Barry S. Todd
Corona, Calif.

[21] Appl. No. 747,604
[22] Filed July 25, 1968
[45] Patented Feb. 16, 1971
[73] Assignee the United States of America as represented by the Secretary of the Navy

[54] MAXIMUM SEEKING ZERO ORDER HOLD CIRCUIT
2 Claims, 2 Drawing Figs.

[52] U.S. Cl. ........ 307/235, 307/246, 324/103, 328/115, 328/151
[51] Int. Cl. ........ H03k 5/20
[50] Field of Search ........ 307/235, 238, 246; 328/115—117, 121, 150, 151; 324/103; 329/109, 108, 101

[56] References Cited

UNITED STATES PATENTS

| | | | |
|---|---|---|---|
| 3,020,397 | 2/1962 | Pierce et al. | 328/115X |
| 3,158,759 | 11/1964 | Jasper | 307/255X |

OTHER REFERENCES

IBM TECHNICAL DISCLOSURE BULLETIN VOL. 8 No. 6 November, 1965 pp. 856— 857 " Peak Detector and Storage System" by K. W. Swearingen

*Primary Examiner*—Donald D. Forrer
*Assistant Examiner*—John Zazworsky
*Attorneys*—Edgar J. Brower and Joseph M. St. Amand

ABSTRACT: A circuit for finding the maximum value of an input signal and providing an output signal at the time the maximum occurred. The input signal is connected to a memory capacitor each time a differential amplifier determines that the input signal exceeds the stored value.

PATENTED FEB 16 1971 3,564,287

BARRY S. TODD
INVENTOR.

BY T. M. Phillips
J. M. St. Amand
ATTORNEYS

MAXIMUM SEEKING ZERO ORDER HOLD CIRCUIT

The invention herein described may be manufactured and used by or for the Government of the United States of America for governmental purposes without the payment of any royalties thereon or therefor.

The present invention relates to maximum seeking zero order hold circuits and more particularly to a maximum seeking zero order hold circuit that can search over a field of values and determine the maximum of those values and where it is located with respect to the search. The present invention provides a circuit which can perform the search and determine the next point of operation required by acquisition-type trackers. Many guidance systems involve an acquisition mode where a field of view is searched and a best or suitable point is determined by finding the maximum of a criteria. The present invention provides a circuit which indicates by an interactive process, the maximum value and when that maximum value has been reached.

The invention embodied in a circuit preforms an iterative process to find the value and time of occurrence of the input maximum. Initially, the memory capacitor is set to zero by a discharge pulse from a programmer (not part of the invention). While an input occurs, a differential amplifier compares the input signal with the value stored on the memory. If the input does exceed the memory, nothing happens. If the input does exceed the memory, a switch connects the input to the memory capacitor thus updating the memory. The circuit then waits for a new input. At the end of the input sequence, the maximum value will be stored and the last differential amplifier output will have occurred at the time of the maximum.

Many of the attendant advantages of this invention will become readily appreciated as the same becomes better understood by reference to the following detailed description when considered in connection with the accompanying drawings wherein.

Figure 1:
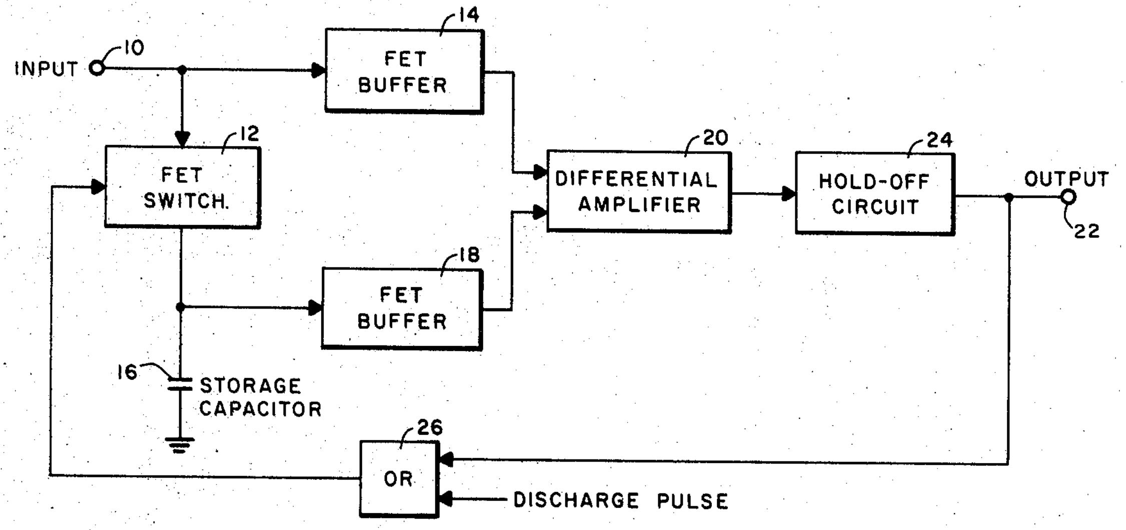
FIG. 1 is a block diagram of a preferred embodiment of the invention.

Referring now to the drawings there is shown in FIG. 1 an input terminal 10 for receiving an input signal level which may be present continuously. Coupled to input terminal 10 are field effect transistor switch 12 and field effect transistor buffer 14. A storage capacitor 16 is connected to the output of switch 12. Also coupled to the output of switch 12 is field effect transistor buffer 18. The outputs of field effect transistor buffers 14 and 18 are fed into differential amplifier 20 which provides an output signal coupled to output terminal 22 through holdoff circuit 24. The output from holdoff circuit 24 is coupled through OR circuit 26 to field effect transistor switch 12. A discharge pulse from a programmer (not shown) is also fed into OR circuit 26 which may be used to discharge capacitor 16 to start a new cycle of operation.

Figure 2:
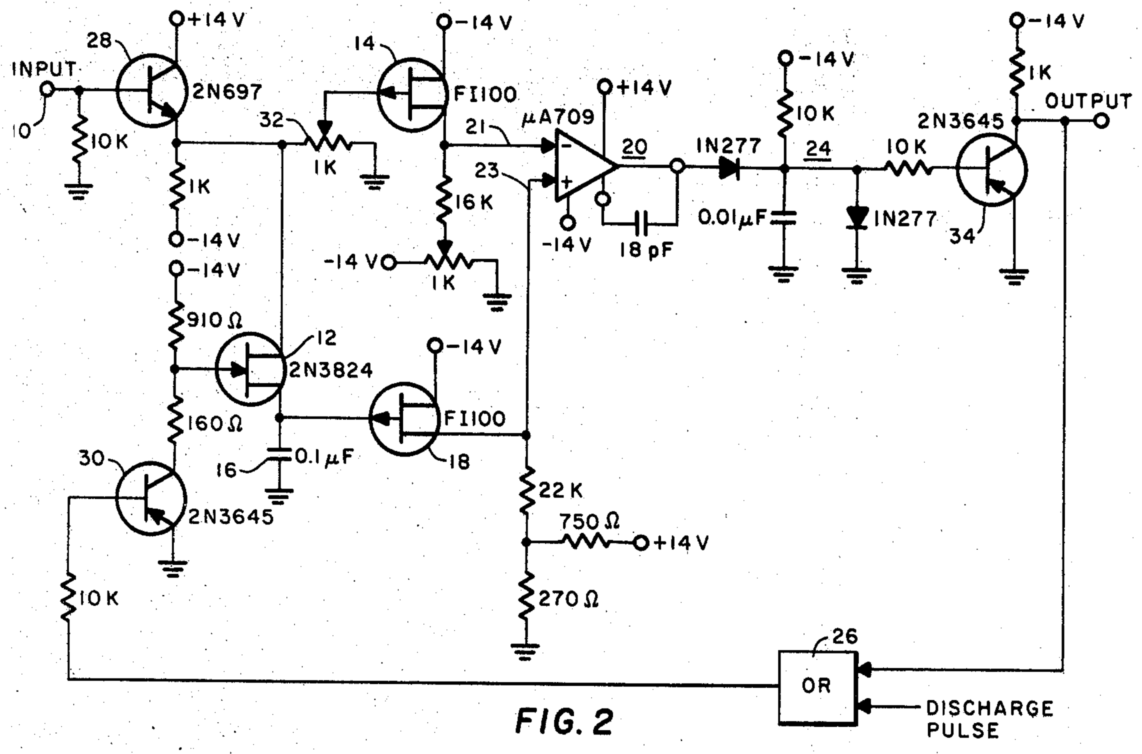
FIG. 2 is a schematic diagram of the embodiment of FIG. 1.

Referring to FIG 2, corresponding elements have been given the same reference numerals as the same elements shown in block form in FIG. 1.

Field effect transistor buffer 18 is provided to allow a very high resistance load across storage capacitor 16 while field effect transistor 14 is provided to obtain a similar voltage drop so as to present an accurate indication of any difference in the level of the stored voltage and the level of the voltage at terminal 10 to differential amplifier 20. Using the values shown in FIG. 3 and assuming the voltage on capacitor 16 is zero, with a positive voltage applied at input terminal 10, emitter-follower 28 couples this signal to field effect transistor switch 12 and field effect transistor buffer 14 through gain trim control 32. The output of field effect transistor buffer 14 is connected to input 21 of differential amplifier 20. Assuming field effect transistor switch 12 is off, voltage on storage capacitor 16 is fed through field effect transistor buffer 18 to input 23 of differential amplifier 20. Since the voltage drops are equal, a net positive voltage appears at the inverting terminal 21 of differential amplifier 20 with respect to the noninverting terminal 23. Differential amplifier 20 should have a high gain so that this input difference generates a negative output which is large enough to drive transistor switch 34 through holdoff circuit 24. The output of transistor switch 34 is zero volts. If no discharge input appears at OR circuit 26 its output is zero causing transistor switch 30 to remain off. This applies a negative 14 volts to field effect transistor 12 holding it off. The input signal at terminal 10 is isolated from storage capacitor 16 by means of emitter-follower 28. A negative voltage at input 10, representing an input exceeding the stored value following the same path as described above, creates a net negative signal at inverting input 21 with respect to noninverting input 23. The resulting positive output of differential amplifier 20 through hold off circuit 24 turns transistor digital inverter 34 off. The signal out of transistor digital inverter 34 is −14 volts. The −14 volts is applied to transistor switch 30 through OR circuit 26. This turns transistor driver 30 on resulting in a near zero voltage at the gate of field effect transistor switch 12 turning it on and charging capacitor 16 up to the input signal at terminal 10 level.

When memory capacitor 16 has charged to the input value applied at terminal 10, the output of differential amplifier 20 returns to a negative value. Holdoff circuit 24 keeps field effect transistor switch 12 turned on for a short time longer to allow memory capacitor 16 to become fully charged and to provide a minimum output pulse width.

Obviously many modifications and variations of the present invention are possible in the light of the above teachings. It is therefore to be understood that within the scope of the appended claims the invention may be practiced otherwise than as specifically described.

I claim:

1. In the maximum seeking zero order hold circuit, the combination comprising:
   a. comparison circuit means having first and second inputs and an output;
   b. signal input terminal means for continuously receiving input signals;
   c. storage circuit means;
   d. switching means having a normally nonconducting condition and a conducting condition coupled between said signal input terminal means and said storage circuit means;
   e. circuit means for coupling said signal input terminal means to the first input of said comparison circuit means;
   f. circuit means continuously connecting said storage circuit means to the second input of said comparison means;
   g. inverter circuit means coupled to the output of said comparison circuit means and generating an output signal only when the magnitude of the signal received at the first input of said comparison circuit means is greater than the magnitude of the signal received at the second input of said comparison circuit means; and
   h. feedback circuit means coupling the output of said inverter circuit means to said switching means for changing said switching means from a normally nonconducting condition to a conducting condition and allowing said storage circuit means to be charged to the maximum value of the signal present at said signal input terminal means.

2. The circuit of claim 1 wherein said storage circuit means is a long term storage capacitor.